United States Patent [19]

Parshall

[11] 4,343,701

[45] Aug. 10, 1982

[54] HIGH PRESSURE FLAT BED FILTER

[75] Inventor: David G. Parshall, Northville, Mich.

[73] Assignee: AMSTED Industries Incorporated, Chicago, Ill.

[21] Appl. No.: 253,029

[22] Filed: Apr. 10, 1981

[51] Int. Cl.³ .............................................. B01D 29/02
[52] U.S. Cl. ..................................... 210/387; 210/398
[58] Field of Search ........ 210/232, 236, 387, 398–401, 210/435, 447

[56] References Cited

U.S. PATENT DOCUMENTS

| | | | |
|---|---|---|---|
| 3,333,693 | 8/1967 | Hirs | 210/387 |
| 3,335,862 | 8/1967 | Hirs | 210/387 |
| 3,933,650 | 1/1976 | Lentz | 210/398 |
| 4,233,157 | 11/1980 | Miller | 210/387 |

Primary Examiner—Ivars C. Cintins
Attorney, Agent, or Firm—Fred P. Kostka; Edward J. Brosius; Tony T. Shu

[57] ABSTRACT

In a filter device a filter media belt is positioned over a horizontal grid panel. Ends of the belt extend beyond the panel and each is attached to a rotatable forward and rear spool carried outside a cover which encases the grid panel. The cover defines an inner chamber above the grid panel which may be selectively sealed by a closure of doors located at each end of the cover. The cover, doors, and grid panel are sufficiently reinforced to allow the inner chamber to be partially filled with a batch of a liquid-particulate mixture and then pressurized to force the liquid portion through the filter belt and grid panel. During pressurization, longitudinal gasket devices maintain edges of the filter belt sealed against the grid panel. With the liquid portion removed, the particulate in the form of a cake remains on the filter belt. The chamber then is depressurized, the doors opened, and the belt moved forward by rotation of the forward spool. During this belt movement, the particulate is removed from the belt and the belt cleaned. The belt is then moved in a rearward direction to return the belt to its original position wherein the filter device is ready to process a further liquid-particulate mixture batch.

8 Claims, 16 Drawing Figures

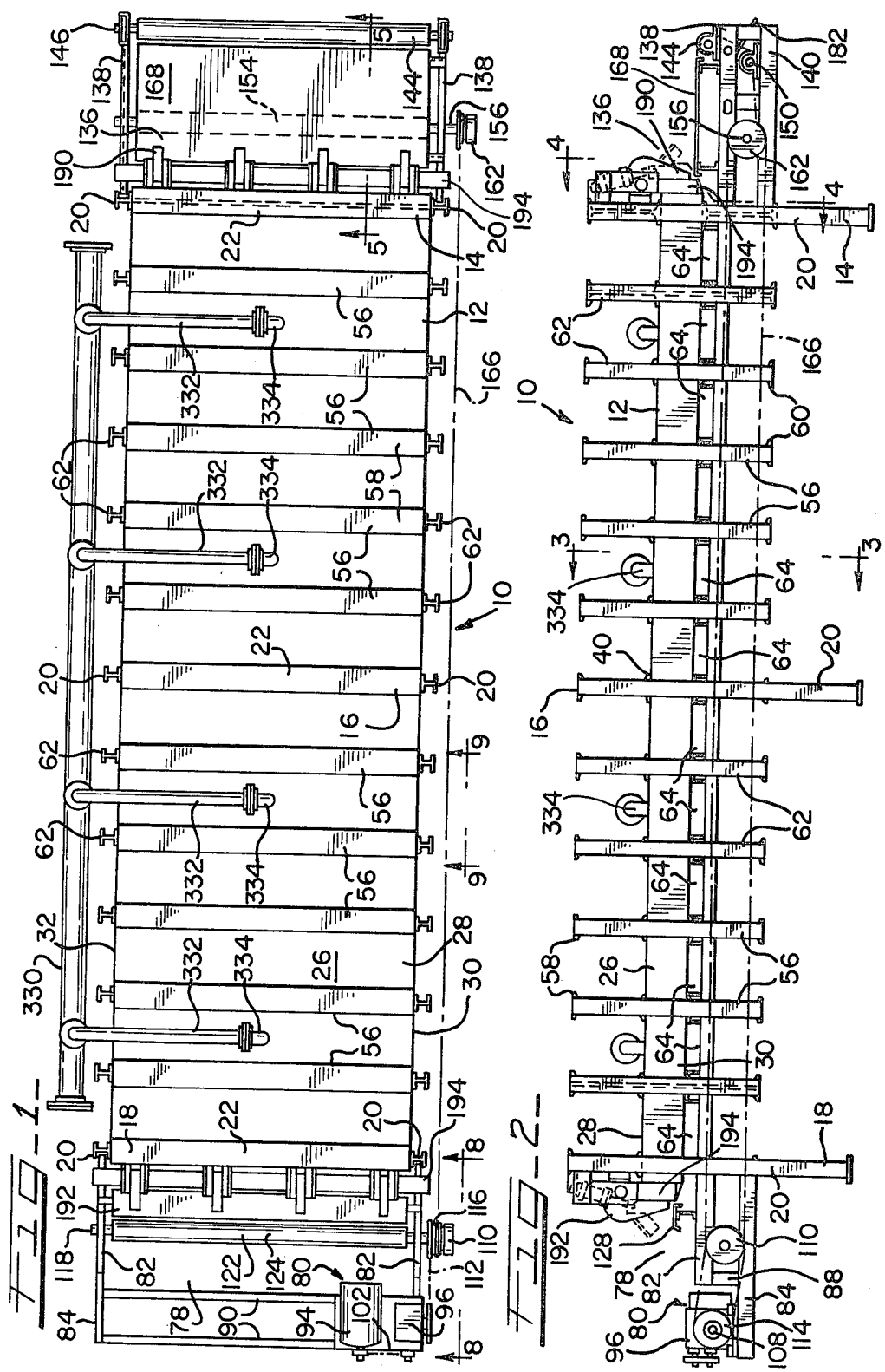

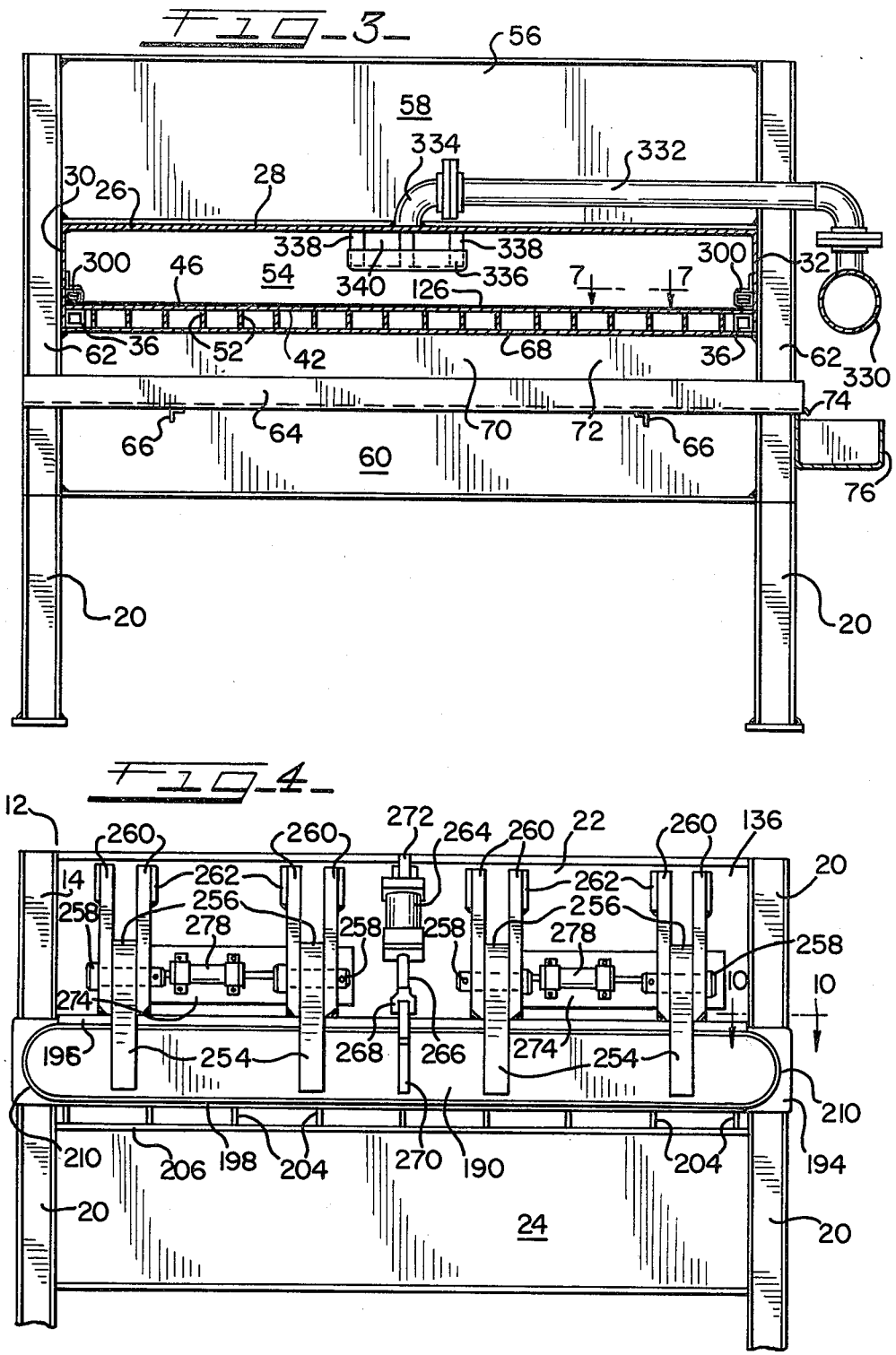

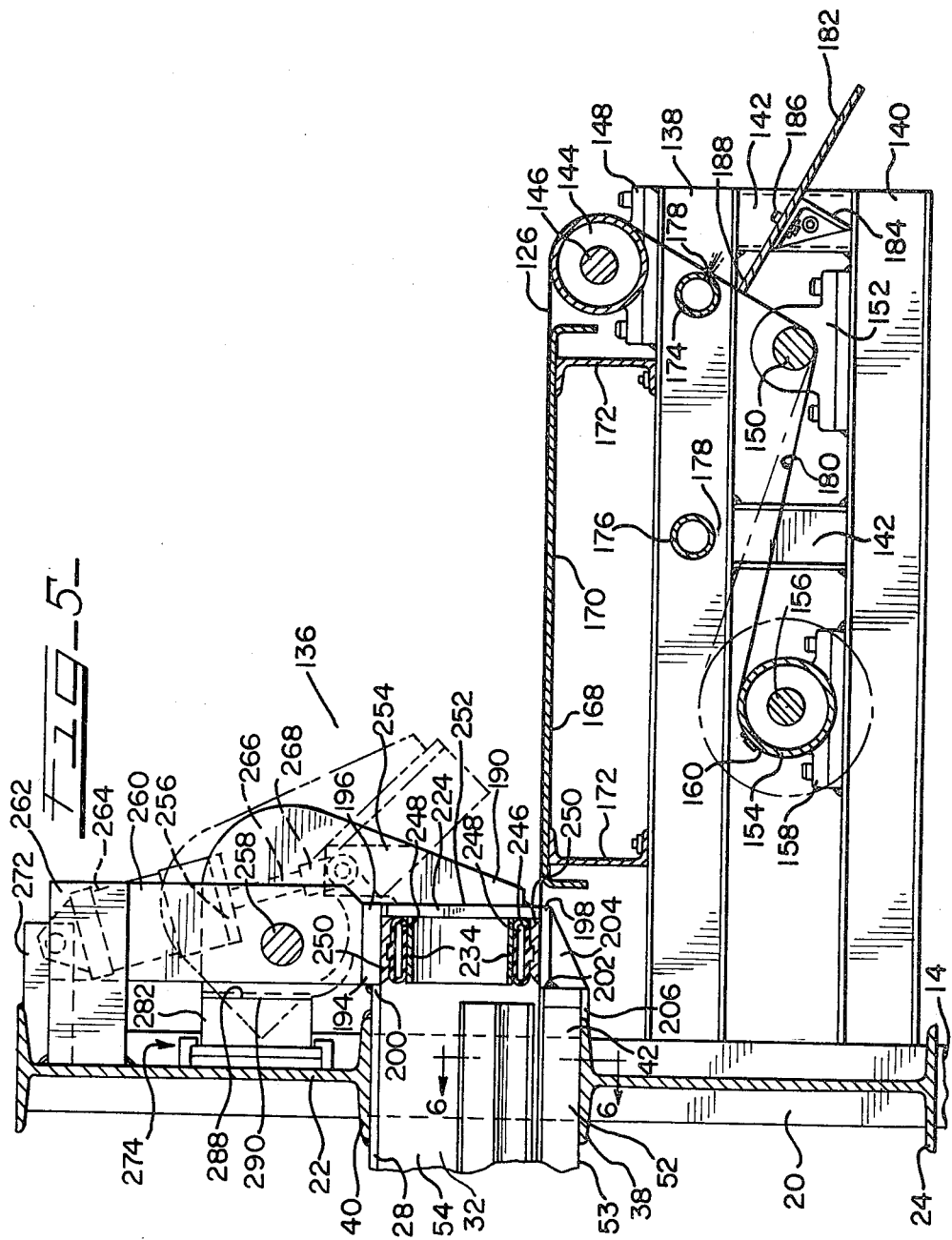

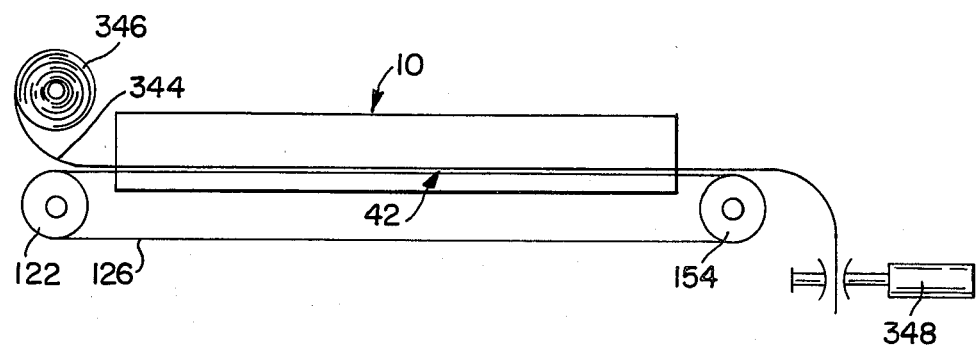
FIG-16-
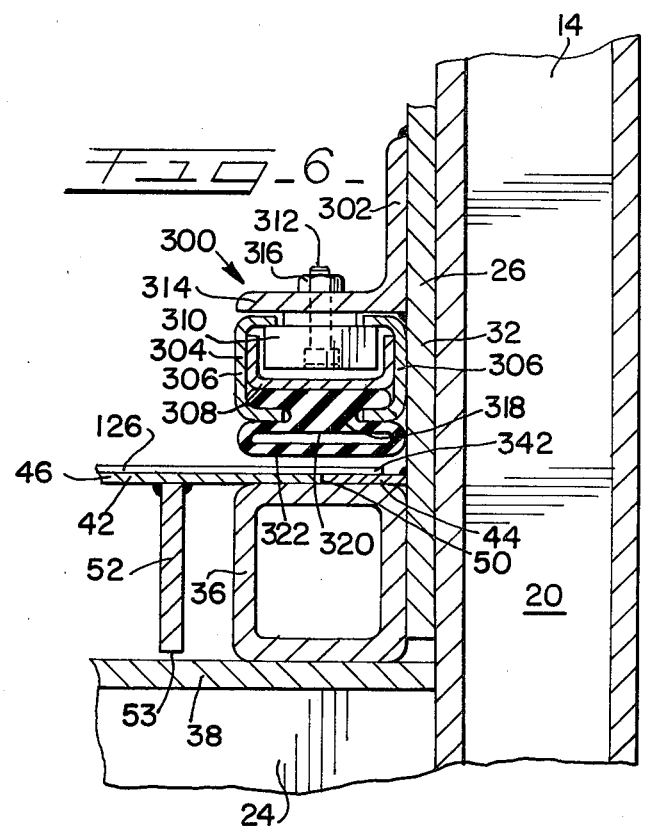
FIG-6-

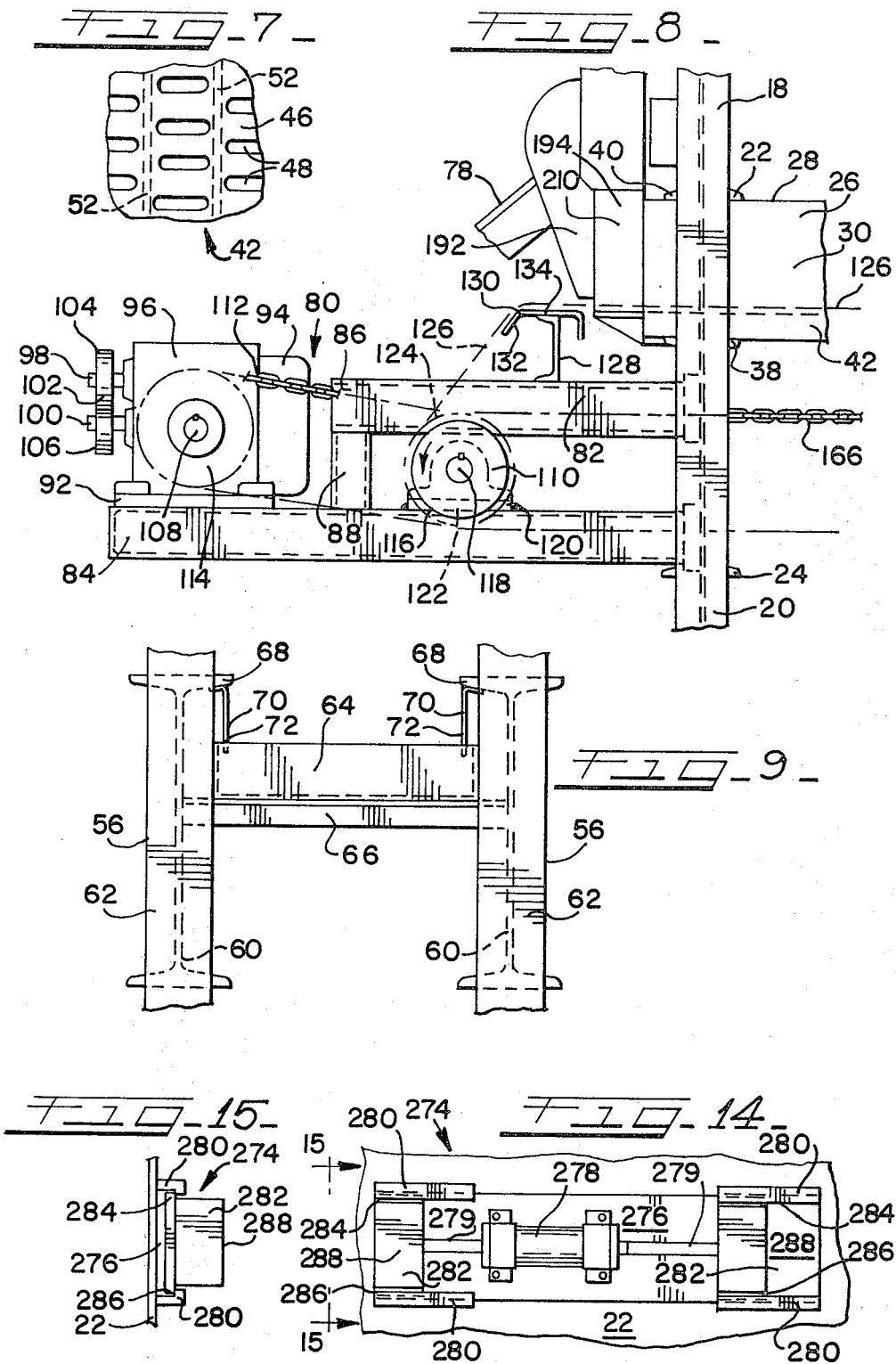

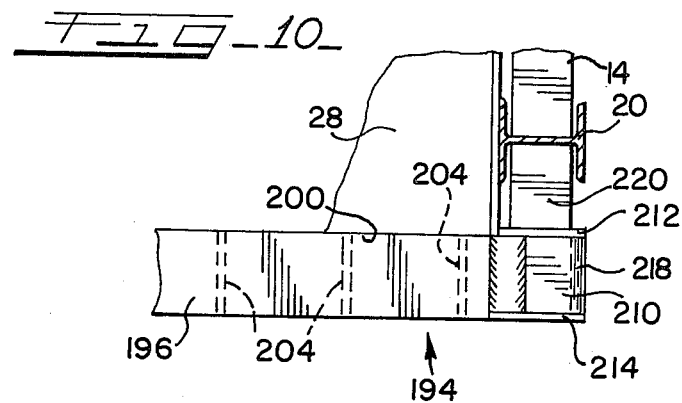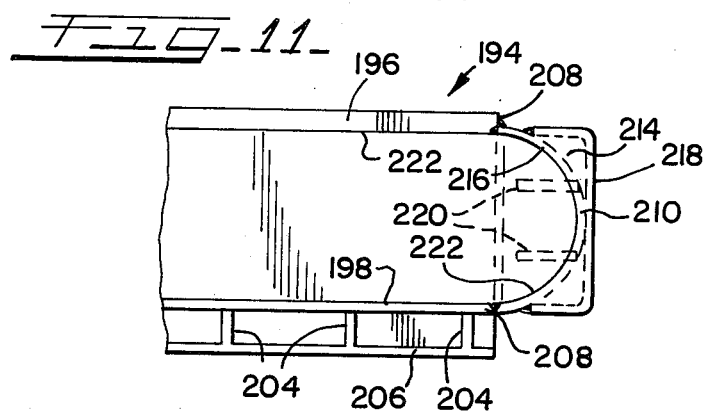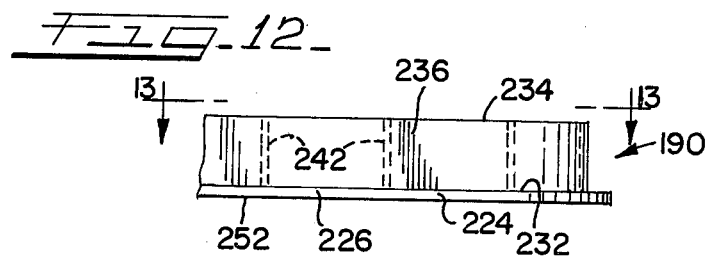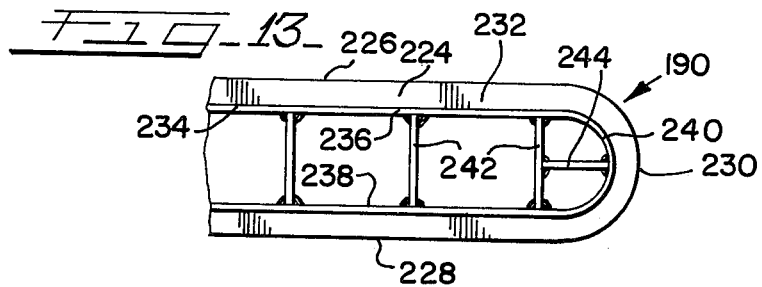

HIGH PRESSURE FLAT BED FILTER

BACKGROUND OF THE INVENTION

1. Field of the Invention

This invention relates to filtering devices for separating a liquid-particulate mixture into distinct portions and more particularly to a flat bed type filter in which separation may be advanced by applying a pressure to the liquid-particulate mixture.

2. Description of the Prior Art

Filter devices for separating foreign matter from a liquid flow are well known. Such devices may take a number of forms depending on the type of operation, i.e. batch or continuous, the percentage concentration of the foreign matter, the physical nature of the foreign matter, and the type of controls which may vary from fully manual to fully automatic.

One well known type of filter device is the flat bed filter where a batch of a liquid-foreign matter mixture is pumped into a filter chamber having a filter media bottom. Depending on the particle size of the foreign matter, the filter media bottom can vary from an open grid panel to provide straining to a filter cloth precoated with diatomaceous earth for retaining matter of a few microns in size. Usually the filter cloth is attached to a conveying device which allows the filter cloth to be readily withdrawn from the filter after use. A movable cover, which seals the mixture in the filter device during operation, is raised to allow this movement. Pressures as high as 20 psi are applied to the mixture to promote liquid flow.

The flat bed type filter offers the user a relatively simple device to operate, a large filter media area to allow high through-put, and flexibility to meet varying operating conditions.

SUMMARY OF THE INVENTION

A flat bed type filter of this invention includes a flat horizontal grid panel located under a cover to define an inner chamber. The grid panel is covered by a filter media belt. Ends of the belt are attached to a front and a rear rotatable spool located at each end and outside of the grid panel.

The chamber may be selectively sealed by a closing of doors carried by the filter at each end of the cover. The grid panel, cover and doors are so reinforced to allow a batch of the liquid-particulate mixture to be pumped into the chamber and then the chamber pressurized to proximately 100 psi. This high pressurization helps to promote the flow of the liquid portion through the filter belt and grid panel with the particulate being retained on the filter belt.

When the separation is complete, the chamber is vented and the doors are opened. The forward spool is then activated to draw the filter belt and collected particulate from the chamber. As the belt winds up on the forward spool, the particulate is scraped from the belt, and the belt is flushed clean. The rear spool is then actuated so that the cleaned portion of the belt is returned to the chamber. Further processing may now proceed.

The flat bed filter of this invention has several advantages over known flat bed filters.

First, this filter allows the use of pressures proximately five times greater in value than those previously available to promote liquid-particulate separation. Where the particulate is of a semisolid consistency, i.e. sludge-like, use of higher pressures is particularly advantageous in that the liquid portion does not readily separate from the nonliquid portion. Use of higher applied pressures also allows separation to be more readily effected. Thus, the capacity of the filter to process a given quantity of mixture in a given time period is increased.

A further advantage of this inventive flat bed type filter is its filter media belt arrangement. The belt may be a permanent media type, usable with a precoat diatomaceous earth system where the particulate includes unusually small particles, or used with disposable filter media.

Where a permanent filter belt is used, this arrangement allows the belt to be readily cleaned and returned to service. Additionally, the filter belt can be used to support and move disposable filter media sheet which retains the particulate. Disposable media is particularly useful when the particulate has an adhesive nature to impede its removal from the filter belt.

Lastly, this flat bed type filter incorporates a unique sealing arrangement wherein access to the filter inner chamber is limited to doors at each end of the cover. Heretofore, flat bed type filters included a stationary lower shell portion and a movable upper shell portion. Sealing between those two portions is required about the entire common periphery shared by the portions. As the size, i.e. effective area of filtration, is increased, not only must the size of the lifting means connected to the movable upper shell portion be increased but a more extended length of sealing is required. This inventive flat bed type filter requires no upper shell lifting means and the magnitude of the problem of sealing does not increase in proportion with the size of the filter.

DESCRIPTION OF THE DRAWINGS

FIG. 1 is a plan view of a flat bed type filter incorporating this invention.

FIG. 2 is a side elevation view of the filter of FIG. 1.

FIG. 3 is a cross-sectional elevation view of the filter as seen generally along the line 3—3 of FIG. 2.

FIG. 4 is an elevation view of a forward end of the filter as seen generally along the line 4—4 of FIG. 2.

FIG. 5 is a further cross-sectional elevation view of the forward end of the filter as seen generally along the line 5—5 of FIG. 1.

FIG. 6 is a cross-sectional elevation view of the filter as seen generally along the line 6—6 of FIG. 5.

FIG. 7 is a fragmentary plan view of a perforated plate of a grid panel of the filter as seen generally along the line 7—7 of FIG. 3.

FIG. 8 is a fragmentary side elevation view of a rear end of the filter as seen generally along the line 8—8 of FIG. 1.

FIG. 9 is another fragmentary elevation view of the filter as seen generally along the line 9—9 in FIG. 1.

FIG. 10 is a fragmentary cross-sectional plan view of a door frame of the filter as seen generally along the line 10—10 in FIG. 4.

FIG. 11 is an elevation view of the door frame of FIG. 10.

FIG. 12 is a fragmentary plan view of a door of the filter.

FIG. 13 is an elevation view of the door as seen generally along the line 13—13 in FIG. 12.

FIG. 14 is a detailed fragmentary elevation view of a door locking device of the filter.

FIG. 15 is a side elevation view of the door locking device as seen generally along the line 15—15 in FIG. 14.

FIG. 16 is a schematic view of the filter of FIG. 1 using disposable filter media.

DESCRIPTION OF THE PREFERRED EMBODIMENT

A flat bed type filter of this invention is shown generally in FIGS. 1 and 2 and designated 10. The filter 10 has an elongated body 12 carried on longitudinally spaced forward, middle and rear support frames 14, 16, 18. Each frame 14, 16, 18 comprises a pair of laterally spaced uprights 20 connected by an upper and lower crossbeam 22, 24.

The filter body 12 further includes an inverted pan-shaped cover 26 defined by a horizontal top 28 and downward depending sidewalls 30, 32. Fastened to an inner side of each cover sidewall 30, 32 are tube members 36 and as seen in FIG. 6, one tube member 36 is shown associated with the cover sidewall 32. The tube members 36 extend partially below the cover sidewalls 30, 32 so that each member 36 rests on a top flange 38 of the lower crossmember 24 of each support frame 14, 16, 18. Additional support for the filter body 12 is provided by the upper crossmember 22 of each frame 14, 16, 18 which has a bottom flange 40 fastened to the cover top 28.

A grid panel 42 is located between the tube members 36. To provide for proper spacing of the grid panel 42, a metal strip 44 is attached to an upper surface of each tube member 36 as shown typically in FIG. 6. The grid panel 42 includes a grid plate 46 containing a series of elongated perforations 48, see FIG. 7. Side edges 50 of the grid plate 46 abut the strips 44 to form a close and horizontally aligned fit therewith. To reinforce the grid plate 46, a series of downward depending ribs 52 are joined to the plate 46. A bottom 53 of each rib 50 is located just above the top flange 38 of each lower crossmember 24 to insure that the plate 46 of the grid panel 42 seats properly on the tube members 36.

The cover 26 and the grid panel 42 define therein an inner chamber 54 which is reinforced by a series of box-like structures 56 which are located thereabout. Each structure 56 comprises a top and a bottom beam 58, 60 connecting with side beams 62. As is shown in FIGS. 1 and 2, the structures 56 are intermittently spaced between the support frames 14, 16, 18.

As seen in FIG. 2 and shown typically in FIGS. 3 and 9, positioned between the bottom beams 60 of adjacent box structures 56 and between the bottom beams 60 and adjacent lower crossmembers 24 are drip pans 64. Each pan 64 has an open box-like configuration. The pans 64 are carried on pairs of spaced support angles 66 fastened between the bottom beams 60 of the adjacent box structures 56 and between the bottom beams 60 of the box structures 56 adjacent to the support frame lower crossmembers 24. Attached to an underside of a top flange 68 of each box structure bottom beam 60 and to the top flange 38 of the lower crossmembers 24 is a liquid deflecting angle 70. Each angle 70 extends laterally across the entire width of the filter body 12 and has a vertical leg portion 72 which projects downwardly within a respective pan 64. An end of each pan 64 is formed with a lip 74 which is located over a longitudinal collection trough 76. The trough 76 is carried by the uprights 20 of the support frames 14, 16, 18. The trough 76 in turn connects with a clean liquid discharge (not shown) in a known manner.

At a rear end 78 of the filter body 12 is a drive assembly 80 shown in detail in FIG. 8. The assembly 80 is carried by a pair of upper and lower spaced supports 82, 84 which are attached to and extend outwardly from the uprights 20 of the rear support frame 18. The lower supports 84 are longer than the upper supports 82 so that ends 86 of each upper support 82 are joined to a respective lower support 84 by an intermittently positioned vertical channel member 88. Connecting ends of the pair of lower supports 84 is a pair of laterally positioned, spaced crossbraces 90. A base plate 92 is attached at one end of the crossbraces 90.

An electric motor 94 and a gear speed reducer 96 having a ratio of 50 to 1 are mounted on the base plate 92. An output shaft 98 of the motor 94 is operatively connected to an input shaft 100 of the speed reducer 96 by a belt 102 carried by a drive pulley 104 attached to the motor output shaft 98 and a driven pulley 106 attached to the speed reducer input shaft 100. An output shaft 108 of the speed reducer 96 in turn is operatively connected to a pneumatically activatable rear clutch 110 by a first chain loop 112. The chain loop 112 is carried by a drive sprocket 114 keyed to the speed reducer output shaft 108 and by a first sprocket portion of a double sprocket 116 of the clutch 110.

The clutch 110 is secured to one end of a spool shaft 118 journaled in spaced pillow blocks 120 which in turn are fastened to the lower supports 84. Between the pillow blocks 120 on the shaft 118 is a rear filter belt spool 122 carrying a wound portion 124 of a filter media belt 126.

Above the rear filter belt spool 122 is a laterally positioned rear filter belt guide assembly 128. The assembly 128 is carried by the spaced upper supports 82 and includes a guide plate 130 formed with a downwardly angled lip 132 which joins a flat horizontal portion 134. The horizontal portion 134 aligns with the plate 46 of the grid panel 44 while the lip 132 is in substantially tangential alignment with the rear filter belt spool 122.

At a forward end 136 of the filter body 12, which is shown in more detail in FIG. 5, is a similar pair of spaced upper and lower horizontal supports 138, 140. These supports 138, 140 are attached to the uprights 20 of the forward support frame 14 and extend outwardly therefrom. Between each adjacent upper and lower support 138, 140 is a pair of vertical channels 142. At an outer end of the upper supports 138 is a forward upper guide roll 144. The roll 144 is carried by an upper roll shaft 146 journaled in a pair of spaced pillow blocks 148 affixed to the upper supports 138.

On the lower supports 140 is a forward lower guide shaft 150 having ends journaled in spaced pillow blocks 152 which in turn are attached to the lower supports 140. Between the lower guide shaft 150 and the forward support frame uprights 20 is a forward filter belt spool 154. The spool 154 is carried on a shaft 156 journaled in spaced pillow blocks 158 which in turn are affixed to the lower supports 140. A forward edge 160 of the filter media belt 126 is connected to the spool 154. On an end of the shaft 156 is a pneumatically activatable forward clutch 162. The forward clutch 162 includes a sprocket which is operatively connected to a second sprocket portion of the rear clutch double sprocket 116 by a second chain loop 166.

To support the filter belt 126 between the grid panel 42 and the forward upper guide roller 144 is a forward filter belt guide assembly 168. The assembly 168 comprises an inverted U-shaped guide plate 170 attached to a pair of spaced support channels 172. Each channel 172 in turn is attached to the upper supports 138. The forward guide plate 170, like the rear guide plate 130, is aligned with the grid panel perforated plate 46.

To assist in removing particulate which has collected on the filter media belt 126 during operation of the filter device 10, an initial air blow-off header 174 and a final spray liquid header 176 are carried laterally between the upper supports 138. Each header 174, 176 has a set of nozzles 178 directed toward an underside 180 of the filter belt 126. Gross particulate separation is effected with a scraper plate 182 carried by a set of angle brackets 184 which in turn are attached to the vertical channels 142. The plate 182 is positioned at a proximate right angle to the filter belt 126 located between the upper guide roll 144 and the lower guide shaft 150. By means of adjusting screws 186, an inner edge 188 of the plate 182 may be positioned immediately adjacent to the filter belt 126 without actually contacting such.

At the ends 78, 136 of the filter body 12 is a forward and a rear door 190, 192. Each door 190, 192 fits into a door frame 194. Because the doors 190, 192 and respective door frames 194 are identical in design only the forward door 190 and its frame 194 will be described in detail. This description can be better understood by viewing FIGS. 4, 5, 10–13.

The door frame 194 is defined in part by horizontal top and bottom plates 196, 198. The top plate 196 connects in a sealed manner with an outer edge 200 of the cover top 28. The bottom plate 198 in turn abuts an outer edge 202 of the grid panel perforated plate 46 and is carried by a series of wedge-shaped gussets 204. The gussets 204 are affixed to a spacer plate 206 welded to the top flange 38 of the support frame lower crossmember 24.

Attached to outer ends 208 of the top and bottom plates are end caps 210. Each end cap 210 includes spaced inner and outer end wall plates 212, 214. The outer end wall plate 214 is formed with a semicircular cutout. Located between these plates 212, 214 is a radiused inner sidewall element 216. To complete the cap 210, an outer channel 218 is fitted between the end wall plates 212, 214. To secure the position of each end cap 210, a pair of spaced horizontal members 220 are affixed to the inner end wall plate 212 and to a respective upright 20 of the support frame 14. Ends 208 of the top and bottom plates 196, 198 join the end caps 210 so that the radiused inner sidewall element 216 and the plates 196, 198 form a continuous flat sealing surface 222 within the door frame 194.

The forward door 190 comprises an outer vertical plate member 224 having a top and a bottom edge 226, 228 which join radiused end edges 230. The door outer plate member 224 fits loosely within the door frame 194 as the door edges 226, 228 and 230 are dimensioned to provide proximately ¼ inch space between such and the door frame sealing surface 222.

Attached to an inner side 232 of the door vertical plate member 224 is a gasket holding frame 234. The frame 234 is defined by an upper and lower horizontal support rib 236, 238 which join with radiused end ribs 240. The ribs 236, 238, 240 are reinforced by a series of vertical braces 242 located between the upper and lower ribs 236, 238 and a horizontal brace 244 which connects each radiused end rib 240 with a respective adjacent vertical brace 242.

An inflatable gasket loop 246 is secured to the door gasket holding frame 234, see FIG. 5. The gasket loop 246 has an inner cavity 248 which is connected to a source of a pressurized incompressible liquid, i.e. water. When this cavity is filled, the gasket 246 expands so that a sealing strip portion 250 is forced outwardly to form a seal with the sealing surface 222 of the door frame 194.

To an outer surface 252 of the door plate member 224 are attached two sets of hinge straps 254 forming part of four hinge devices, see FIGS. 4, 5. Each strap 254 has an offset pivot pin portion 256 which is rotatively joined to a pivot pin 258 carried by a pair of spaced hinge brackets 260. Each hinge bracket 260 in turn is attached to the support frame upper crossmember 22 by a horizontal support bracket 262.

An air cylinder 264 used to lift or lower the door 192 is centrally located. Fitted to an end of a piston rod 266 of the cylinder 264 is a clevis attachment 268. The clevis attachment 268 in turn is pivotally joined to a door air cylinder bracket 270 affixed to the outer surface 252 of the door outer plate member 224. An upper end of the cylinder 264 likewise is pivotally attached to an upper support bracket 272 which in turn is affixed to the support frame upper crossmember 22.

To prevent the door 192 from swinging open when the inner chamber 54 is pressurized, a pair of locking assemblies 274 is attached to the support frame upper crossmember 22 and located between the crossmember 22 and the pairs of door hinge straps 254. Each assembly 274, see FIGS. 4, 5, 14 and 15, includes a mounting plate 276 to which is attached an air cylinder 278. Each air cylinder 278 has a pair of oppositely extending horizontal piston rods 279. At each end of the mounting plate 276 is a pair of horizontal guides 280. Locking blocks 282 each having an upper and lower edge portion 284, 286 carried in the guides 280 are attached respectively to the air cylinder piston rods 279. An outer face 288 of each block 282 is formed on a slight angle so as to produce a wedge effect with a locking edge 290 of the hinge strap offset pivot portion 256 upon selective activation of the air cylinders 278.

As more easily understood by viewing FIGS. 3 and 6, a filter media belt edge sealing device 300 is carried longitudinally on an inside of each cover sidewall 30, 32. Each sealing device 300 includes a support angle 302 fastened directly to the sidewall and as shown in FIG. 6 to the sidewall 32. The device 300 further includes a carrier tube 304 defined by spaced vertical channel members 306 connected by a horizontal channel member 308. Periodically spaced along the carrier tube 304 between the vertical channels 306 and above the horizontal channel 308 are a series of mounting blocks 310. A bolt 312 extends upwardly through each mounting block 310 and is threadedly secured to a horizontal leg 314 of the support angle 302 by a nut 316.

An inflatable tube gasket 318 is held by the vertical channels 306 below the horizontal channel 308. The gasket 318 has an inner cavity 320 which is likewise operatively connected to the source of the pressurized incompressible liquid. By filling the gasket cavity 320 with such, a longitudinal sealing lip 322 is forced downward against an edge 342 of the filter media belt 126 so that a seal is formed between the belt 126, the strip 44, and the grid panel plate 46.

The liquid-particulate mixture is delivered to the filter 10 by a distribution manifold 330. The manifold 330 is connected to the filter body chamber 54 by a series of headers 332. As seen in FIG. 3, a discharge end 334 of each header 332 is located above an elongated distribution pan 336. The pan 336 in turn is carried by a series of straps 338 suspended from an inside of the cover top 28. This arrangement provides open spaces 340 between the pan 336 and the cover top 28 to effect an even distribution of the mixture within the chamber 54.

The filter 10 operates on a cycle basis in that the liquid-particulate mixture is processed batchwise. Assuming that the filter 10 is ready to receive a further batch of the liquid-particulate mixture, the forward and rear doors 190, 192 are closed with the inner cavities 248 filled with water under pressure to inflate the door gasket loops 246. This inflation forces the sealing strip 250 of each gasket 246 against the inner door frame surfaces 222 to form a respective seal therebetween. Additionally, the air cylinders 278 of each door locking assembly 274 have been selectively activated so that the angled face 288 of the locking blocks 282 compressively engages with the locking edges 290 of the door hinge straps 254. Lastly, the inner cavity 320 of each longitudinal tube gasket 318 likewise is filled with water under pressure to inflate the gasket 318. This inflation forces the gasket sealing lip 322 downward and against the belt outer edge 342 and forms a seal therebetween.

The mixture is then pumped from the distribution manifold 330, through the headers 332 and into the filter chamber 54. The pan 336 fills and then overflows to insure that the mixture is evenly distributed over the entire filter media belt 126. During this filling procedure, the chamber 54 is vented in a known manner. With the chamber 54 proximately one-half full, this filling is terminated and the chamber vent closed.

The space in the chamber 54 above the liquid mixture is then pressurized with compressed air to proximately 100 psi. Pressurization of the internal cavity 54 promotes sealing between the door gasket loops 246 and the respective door frames 194 and the door gasket holding frames 234. This pressure also forces the liquid portion of the mixture through the filter media belt 126 and supporting grid panel 42. During this flow, the particulate portion of the mixture is retained by the belt 126 so as to gradually form a cake. The liquid portion which flows through the media belt 126 and the grid panel runs into the collection pans 64. The angles 66 insure that no liquid is lost. From the pans 64 the liquid moves into the discharge trough 76 where it may await further processing.

When substantially all of the liquid has been forced through the filter belt 126, the chamber 54 is again vented to reduce the pressure to an atmospheric level. Next the door gasket loops 246 and the longitudinal tube gaskets 318 are deflated. Concurrently, the door locking assembly air cylinders 278 are activated in a reverse direction so as to move the locking blocks 282 clear of the hinge strap locking edges 290. The door air cylinders 264 are then energized to raise the forward and the rear door 190, 192.

With the doors 190, 192 open, the motor 94 of the drive assembly 80 is brought on line so that the first and second chain loops 112, 166 rotate in a counterclockwise direction as seen in FIGS. 2 and 5. Note that this initial rotation is not transferred to either media spool 122, 154 because neither air clutch 110, 162 is activated.

With the above-noted steps complete, the forward air clutch 162 is activated so as to connect the motor 94 with the forward spool shaft 156. As the forward spool 154 rotates, the filter media belt 126 and particulate thereon are drawn slowly forward. As the belt 126 and particulate change direction from the horizontal to the vertical at the upper guide roll 144, the particulate falls off the belt 126, hits the scraper plate 182, and is deflected in a receptacle (not shown). Any particulate remaining on the belt 126 is removed upon contact with the inner edge 188 of the scraper plate 182.

Concurrently, air and a cleaning liquid, i.e. water, are supplied to the headers 174, 176. The air from the nozzles 178 of the air blow-off header 174 promotes further separation of the particulate from the belt 126. On the other hand, the cleaning liquid from the nozzles 178 of the spray header 176 penetrates the belt 126 from its underside 180. Any particulate entrapped within the belt 126 is thus rinsed therefrom. During these particulate removal and belt cleaning steps, the wound portion 124 of the belt 126 is drawn from the rear spool 122 and moves over the filter grid panel 42.

When the entire portion of the media belt 126 on which particulate had collected has passed under the final spray header 176, the forward air clutch 162 is deactivated. This deactivation stops all forward movement of the belt 126. Next, the rear air clutch 110 is activated to connect the electric motor 94 with the rear spool 122. The spool 122 rotates counterclockwise as seen in FIG. 8 so that the belt 126 is drawn rearwardly across the grid panel 42. When the belt 126 has returned to its original position, the rear clutch 110 is deactivated and the electric motor 94 is deenergized. The filter 10 is again ready to process a further batch of the liquid-particulate mixture.

It should be understood that the belt 126 can alternately be used as a movable support for disposable filter media sheet 344, see FIG. 16. Where the particulate has a small particle size or includes an oil base material, use of a permanent media such as the belt 126 is not practical since over time the belt 126 will blind off. Disposable filter media 344 supplied from a roll 346 then can be superimposed over the belt 126. In this case, the media 344 and particulate collected thereon are disposed of together. When the belt 126 is being drawn in a rearward direction over the grid panel 42, a belt holding device 348 is activated to prevent movement of the disposable filter media 344.

While various modifications may be suggested by those versed in the art, it should be understood that I wish to embody within the scope of the patent warranted hereon, all such modifications as reasonably and properly come within the scope of my contribution to the art.

What is claimed is:

1. In a filtering device for receiving a batch of a liquid-particulate mixture to separate said liquid and said particulate into discrete portions, an improvement in said filtering device comprising, a filter body having a cover positioned over and affixed to a permeable grid panel to define an inner chamber, door frames carried by said filter body at ends of said inner chamber, each said frame having an inner sealing surface, doors pivotally carried one each by an upper member of a supporting means attached to said body adjacent to said door frame, each said door having an inflatable gasket with an inner cavity operatively connected to a source of a pressurized incompressible liquid for forcing a sealing strip of said gasket against said door frame sealing surface and forming a seal therewith, a filter media belt having ends connected to selectively rotatable spools carried by said filter body exterior of said inner chamber ends, said belt extending through said chamber in said body and carried therein by said permeable grid panel, and inflatable gaskets carried one each on inner sidewalls of said cover, each said gasket extending between said door frames and positioned over a respective edge of said filter media belt, each said gasket having an inner cavity operatively connected to said incompressible liquid source to force a sealing lip of said gasket against said filter media belt and form a seal between said gasket sealing lip, said filter media belt, and said grid panel, wherein with said doors closed and sealed within said door frame and said elongated gaskets inflated, a batch of said liquid-particulate liquid may be introduced into said filter body inner chamber and subjected to a substantial pressure in said chamber, said pressure causing said liquid portion to flow through said filter media belt and grid panel with said particulate portion being retained by said filter media belt to effect said separation.

2. A filter device particularly adapted for processing batches of a liquid-particulate mixture, a device comprising, filter body means to receive said mixture, said means having a sealable cover located above and affixed to a horizontal perforated grid panel to define an inner chamber, reinforcing means in contact with said cover and said grid panel to allow said inner chamber to be placed in a highly pressurized state, door means swingably carried by said body, said door means in a closed position being sealable within door frame means attached to said body at ends thereof, and in an open position allowing access to said inner chamber, filter media means for retaining said particulate portion in said mixture while allowing said liquid portion to flow therethrough, said filter media means having ends extending exterior of said chamber with a middle portion disposed on said grid panel in said chamber, and gasket sealing means carried by said cover and positioned over each edge of said filter media means, said sealing means in an inflated condition interacting with said filter media means and said grid panel to form a seal therewith, and a deflated condition allowing selected movement of said filter media means, wherein first with said door means being closed and sealed against said door frame means, said gasket sealing means being in said inflated condition and said chamber being partially filled with said mixture, a flow of said liquid portion being induced by said pressurized state in said chamber with said particulate being retained by said media and forming a cake thereon; and secondly, with said door means being in an unsealed condition and swung open to provide access to said chamber, and said gasket sealing means being in a deflated condition, said particulate cake on said media belt being removable from said chamber for disposition of said cake external of said filtering device.

3. In a filter device for cyclic processing a liquid-particulate mixture, said device comprising, an elongated filter body carried by a forward, middle and rear support frame, said body having an inner chamber defined by a cover having a top joined by spaced sidewalls and a horizontal grid panel carried by longitudinal members attached one each along a lower edge of said sidewalls, a series of box-like reinforcing structures carried about said body in a longitudinally spaced relationship, door frames connected one each to a forward and to a rear end of said cover and to a lower crossmember of said forward and rear support frames, doors pivotably attached one each by a hinge device attached to an upper crossmember of said forward and rear support frames, each said door having an inner gasket support frame for a gasket loop having an inflatable cavity for placing a sealing strip of said gasket in a liquid-tight relationship with an inner sealing surface of said door frame, door locking assemblies carried one each by said support frame upper crossmembers, each said assembly having a movable locking block for engagement of said door hinge device to inhibit movement of said door from a closed position, a filter media belt having a middle portion disposed on a perforated plate of said grid panel in said filter body with ends of said belt extending beyond said door frames and attached to rotatable spools carried by supports attached to uprights of said forward and rear support frames, each said spool connected to operative means for selective movement of said belt in a forward and a rearward direction, and longitudinal sealing devices carried one each by sidewalls of said filter body cover, each said device having a tube gasket with an inflatable inner cavity to force a lip of said gasket into a liquid-tight relationship with edges of said filter media belt and said grid panel, wherein during an initial phase of said cyclic processing said doors being closed and sealed within said door frames and maintained closed by said door locking devices, said cavities of said longitudinal sealing device tube gaskets inflated to form a seal between said tube gasket, said filter belt and said grid panel, a lower portion of said filter body inner cavity filled with said liquid-particulate mixture, and an upper portion filled with a highly pressurized gas to promote a flow of said liquid through said filter media belt middle portion and said grid panel perforated plate with said particulate being retained by said belt to form a particulate cake thereon, and during a final phase of said cyclic processing said doors being in an open condition and said tube gaskets of said longitudinal sealing devices being in a deflated condition allowing rotation of said forward spool to move said belt middle portion and said particulate cake from said filter body inner cavity for disposition of said cake external of said device and then allowing rotation of said rear spool to return said filter belt middle portion to within said filter device.

4. A filter device defined by claim 3 and further characterized by including, a roll of disposable filter media located external of said rear end of said filter device, said roll connecting with a middle, unwound sheet portion of said media extending through said filter body inner cavity and resting on said filter media belt, and holding means for selectively engaging a foward, unwound sheet portion of said media to prevent a rearward movement of said disposable filter media, said holding means located external of said forward end of said filter device, wherein during said initial phase of said cyclic processing said particulate is retained by said disposable filter media sheet as said liquid portion in said mixture flows through said disposable filter media sheet, said media belt and said grid panel, and during said final phase of said processing said disposable filter media sheet and particulate are carried from said filter body inner cavity by said filter belt for external disposition with said holding means then activated to engage said disposable filter media sheet as said belt is returned to said filter body.

5. A filter device as defined by claim 3 and further characterized by including liquid portion collecting means comprising, a series of pans carried by said filter body under said filter body grid panel, said pans located respectively between adjacent bottom beams of said boxlike reinforcing structures and adjacent lower crossmembers of said support frames, liquid deflecting angles attached one each to a top flange of said bottom beams and said lower crossmembers, each said angle having a vertical leg extending downward respectively into said pans, and a collection trough longitudinally carried by said support frames adjacent to said filter body, said trough located below a lip formed in a bottom end of said said pan, wherein during said cyclic processing initial phase said liquid flowing through said filter belt and grid panel is directed into said pans by said angles, said liquid then flowing into said trough for subsequent disposition.

6. A filter device as defined by claim 3 and further characterized by including, a distribution manifold connected to a source of said liquid-particulate mixture, a series of headers having an inlet end connected to said manifold and a discharge end connected to said cover top, and a distribution pan located below said header inlets and carried by intermittently spaces straps attached to said cover top and extending downwardly into said filter body inner cavity, wherein during said cyclic processing intial phase said liquid-particulate mixture flows from said source, into said manifold, through said headers and into said filter body inner cavity, said mixture filling and overflowing said pan to be evenly distributed over said media belt.

7. A filter device as defined by claim 3 and further characterized by, each said hinge device comprising pairs of hinges each having a hinge bracket with each said hinge bracket attached to an outer surface of a vertical plate member of said doors respectively, each said hinge bracket connected to a pair of spaced hinge straps by a pivot pin with said straps in turn attached to said support frame upper crossmembers respectively, and said locking assemblies each comprising a set of spaced locking blocks with said blocks of each said set having an upper and lower edge portion slidably carried in a guide of each said assembly, said blocks of each set connected to an air cylinder device for horizontal movement of said blocks in said respective guides, each said block having an angled locking face to selectively form a compressive fit with a locking edge formed on each said hinge bracket respectively, wherein selective activation of said air cylinders moves said locking block into or out of engagement with said hinge brackets.

8. A filter device as defined by claim 3 and further characterized by including drive means for moving said filter belt in a forward or rearward direction, said drive means comprising, a pair of upper and lower horizontal supports attached to uprights forming in part said forward and rear support frames respectively, said pairs extending forwardly and rearwardly from said filter body, a drive assembly carried by said rear support pairs and comprising a motor operatively connected to reduction means for substantially reducing a rate of rotation of an output of said motor, a rear spool having a shaft rotatively carried by said rear lower supports, said filter belt middle portion connecting with a belt wound portion carried by said spool with a rear edge of said belt attached to said spool, rear clutch means carried by said rear spool shaft, said means having a first and a second sprocket portion with said first portion operatively connected to an output of said reduction means, said clutch means having a first operative state to connect said motor to said rear spool shaft and a second operative state to disconnect said motor while allowing said motor to rotate said sprocket portions, a forward spool having a shaft rotatively carried by said forward lower supports with a forward edge of said filter media belt attached to said forward spool, forward clutch means carried by said forward spool shaft and having a sprocket portion operatively connected to said rear clutch second sprocket portion, said forward clutch means having a first operative state to connect said motor to said forward spool shaft and a second operative state to disconnect said motor while allowing said motor to rotate said forward spool sprocket portion, and a forward and a rear media guide, said guides carried respectively by said forward and rear upper supports, each said guide having a guide plate aligned with said grid panel perforated plate, wherein said filter media belt may be moved in said forward direction by energizing said motor and placing said forward clutch means in said first operative state and said rear clutch means in said second operative state, and said media belt may be moved in a rearward direction by placing said forward clutch means in said second operative state and said rear clutch means in said first operative state.

* * * * *